(12) United States Patent
Iijima (10) Patent No.: US 7,205,028 B2
(45) Date of Patent: Apr. 17, 2007

(54) METHOD FOR PRODUCING FUNCTIONAL FILM

(75) Inventor: Tadayoshi Iijima, Tokyo (JP)

(73) Assignee: TDK Corporation, Tokyo (JP)

( * ) Notice: Subject to any disclaimer, the term of this patent is extended or adjusted under 35 U.S.C. 154(b) by 137 days.

(21) Appl. No.: 10/743,733

(22) Filed: Dec. 24, 2003

(65) Prior Publication Data

US 2005/0147745 A1 Jul. 7, 2005

(51) Int. Cl.
*B05D 3/12* (2006.01)

(52) U.S. Cl. ............... 427/359; 427/146; 427/369

(58) Field of Classification Search ............ 427/146, 427/147, 152, 180, 202, 355, 359, 365, 366, 427/369

See application file for complete search history.

(56) References Cited

U.S. PATENT DOCUMENTS

| 5,411,792 | A * | 5/1995 | Yukinobu et al. ............ 428/212 |
| 2001/0008717 | A1 | 7/2001 | Iijima |
| 2002/0012789 | A1 | 1/2002 | Iijima |
| 2002/0037399 | A1* | 3/2002 | Tamai et al. ............... 428/328 |
| 2002/0086138 | A1* | 7/2002 | Iijima ........................ 428/141 |

FOREIGN PATENT DOCUMENTS

| JP | 6-103839 | 4/1994 |
| JP | 7-225302 | 8/1995 |
| JP | 7-235220 | 9/1995 |
| JP | 8-199096 | 8/1996 |
| JP | 9-109259 | 4/1997 |
| JP | 2994764 | 10/1999 |
| JP | 2003-1783 | 1/2003 |
| JP | 2003-001783 A * | 1/2007 |

* cited by examiner

Primary Examiner—William Phillip Fletcher, III
(74) Attorney, Agent, or Firm—Oblon, Spivak, McClelland, Maier & Neustadt, P.C.

(57) ABSTRACT

A method for producing a functional film having at least one functional layer comprising a compressed layer of functional particles on a support, in which the method comprises applying a liquid in which the functional particles are dispersed onto a transfer support and drying the liquid to form a transfer precursor film having a layer containing the functional particles formed on the transfer support; superposing the support on which the functional layer is to be formed and the transfer precursor film so that the support and the layer containing the functional particles are brought into contact with each other, and compressing the layer containing the functional particles to form the compressed layer of the functional particles on the support; and thereafter releasing the transfer support from the compressed layer of the functional particles.

12 Claims, 5 Drawing Sheets

METHOD FOR PRODUCING FUNCTIONAL FILM

BACKGROUND OF THE INVENTION

1. Field of the Invention

The present invention relates to a method for producing a functional film which comprises at least a functional layer comprising a compressed layer of functional fine particles on a support. In the present invention, the functional film includes both a functional film and a functional sheet. In addition, the functional film of the present invention includes a functional film in which a support is a metal.

The functional layer is a layer having a function, and the function means an action accomplished through physical and/or chemical phenomena. The functional layer includes layers having various functions, such as a conductive layer, an ultraviolet shielding layer, an infrared shielding layer, a magnetic layer, a ferromagnetic layer, a dielectric layer, a ferroelectric layer, an electrochromic layer, an electroluminescent layer, an insulating layer, a light-absorbing layer, a light selecting absorbing layer, a reflecting layer, a reflection preventing layer, a catalyst layer, a photocatalyst layer and others.

Particularly, the present invention relates to a method for producing a transparent conductive film having a transparent conductive layer. The transparent conductive layer can be used as a transparent electrode such as an electroluminescence panel electrode, an electrochromic element electrode, a liquid crystal electrode, a transparent plane heater, or a touch panel, and can be also used as a transparent electromagnetic-wave shielding layer.

2. Disclosure of the Related Art

Hitherto, functional films made of various functional materials are produced by the physical vapor deposition method (PVD) such as vacuum vapor deposition, laser ablation, sputtering, or ion plating, or by the chemical vapor deposition method (CVD) such as heat CVD, light CVD, or plasma CVD. These generally require a large-scale apparatus, and among these, some are not suited for forming a film of large area.

Also, a process is known in which a film is formed by application using the sol-gel method. The sol-gel method is suited for forming a film of large area, but in most cases, an inorganic material must be sintered at a high temperature after the application.

For example, with respect to transparent conductive films, the following description can be made. At present, transparent conductive film is produced mainly by the sputtering method. There are various modes for the sputtering method, for example, a method of forming a film by allowing inert gas ions, which are generated by direct current or high-frequency discharge, to be accelerated to hit the surface of a target in vacuum so as to strike out atoms constituting the target from the surface for deposition on the support surface.

The sputtering method is excellent in that a conductive layer having a low surface electric resistance can be formed even if it has a large area to some extent. However, it has a disadvantage that the apparatus is large, and the film forming speed is slow. If the conductive layer is to have a still larger area from now on, the apparatus will be further enlarged. This raises a technical problem such that the controlling precision must be heightened and, from another point of view, raises a problem of increase in the production cost. Further, although the number of targets is increased to raise the speed in order to compensate for the slowness of the film forming speed, this also is a factor that enlarges the apparatus, thereby raising a problem.

An attempt is made to produce a transparent conductive layer by the application method. In a conventional application method, a conductive paint having conductive fine particles dispersed in a binder solution is applied onto a support, dried, and hardened to form a conductive layer. The application method has an advantage in that a conductive layer having a large area can be easily formed, that the apparatus is simple and has a high productivity, and that the conductive layer can be produced at a lower cost than by the sputtering method. In the application method, an electric path is formed by contact of the conductive fine particles with each other, whereby the electric conductivity is exhibited. However, the conductive layer produced by the conventional application method has an insufficient contact, and the obtained conductive layer has a high electric resistance value (i.e. is inferior in conductivity), thereby limiting its usage.

As the production of a transparent conductive layer by a conventional application method, Japanese Laid-open Patent Publication No. 9-109259 (1997) discloses a production method comprising the first step of applying a paint comprising a conductive powder and a binder resin onto a plastic film for transcription and drying it to form a conductive layer, the second step of pressing (5 to 100 kg/cm$^2$) the conductive layer surface on a smooth surface and heating (70 to 180° C.), and the third step of laminating this conductive layer on a plastic film or sheet and heat-press-bonding it.

In this method, a large amount of binder resin is used (100 to 500 parts by weight of conductive powder with respect to 100 parts by weight of binder in the case of inorganic conductive powder; 0.1 to 30 parts by weight of conductive powder with respect to 100 parts by weight of binder in the case of organic conductive powder), so that a transparent conductive film having a low electric resistance value cannot be obtained.

For example, Japanese Laid-open Patent Publication No. 8-199096 (1996) discloses a method in which a conductive layer forming paint comprising a tin-doped indium oxide (ITO) powder, a solvent, a coupling agent and an organic or inorganic acid salt of metal, and not containing a binder is applied onto a glass plate and calcined at a temperature higher than 300° C. In this method, since a binder is not used, the conductive layer will have a low electric resistance value. However, since a calcining step at a temperature higher than 300° C. must be carried out, it is difficult to form a conductive layer on a support such as a resin film. In other words, the resin film will be melted, carbonized, or burnt by the high temperature. Although it depends on the type of the resin film, the temperature of 130° C. may be a limit in the case of polyethylene terephthalate (PET) film, for example.

Japanese Patent Publication No. 2994764 (B2)(1999) discloses a production method of a transparent conductive film, wherein a paste made in such a way that super-fine particle powder of ITO is dispersed in a solvent together with a resin is applied onto a resin film, and is subjected to a rolling process by a steel roller, after drying.

Japanese Laid-open Patent Publication No. 7-235220 (1995) discloses a method comprising the steps of applying a dispersion liquid, which contains conductive fine particles such as ITO and which does not contain a binder, onto a glass support; slowly drying the dispersion liquid; applying an overcoat liquid made of silica sol onto the obtained ITO film; and then drying or calcining after drying. According to the aforesaid Publication, the overcoat film made of silica sol is dried for hardening and shrinking, and the ITO fine particles in the ITO film are brought into firm contact with each other by a hardening-shrinking stress at that time. If the contact between the ITO fine particles is insufficient, the electric resistance of the conductive film is high. In order to obtain a large hardening-shrinking stress, the overcoat film must be subjected to a drying process at a high temperature of 150 to 180° C. However, when the support is a resin film, the resin film will be deformed by such a high temperature.

Also, according to the aforesaid Publication, the overcoat made of silica sol contributes to bonding of the conductive film and the glass support as well. Namely, the strength of the conductive film is obtained by the overcoat made of silica sol. However, the electric resistance of the conductive film is high and the strength of the film is small unless the application and the hardening-shrinking of the overcoat liquid is carried out. Furthermore, in order to improve the optical characteristics of the conductive film and to reduce the surface resistance, the drying step after application of the dispersion liquid of the conductive fine particles on the glass support must be carried out slowly. There is a disadvantage in that cracks may be generated in the overcoat film made of silica sol if the thickness of the film is large.

SUMMARY OF THE INVENTION

From these backgrounds, it is desired to develop a method in which functional layers capable of exhibiting various functions are obtained while utilizing the advantages of the application method that functional layers of large area can be easily formed, that the apparatus is simple and has a high productivity, and that the functional layers can be produced at a low cost.

Particularly with respect to conductive layers, it is desired to develop a method in which a transparent conductive layer having a low electric resistance value is obtained while utilizing the advantages of the application method that a conductive layer of large area can be easily formed, that the apparatus is simple and has a high productivity, and that the conductive layer can be produced at a low cost.

Thus, an object of the present invention is to provide a method for producing a functional film having a functional layer capable of exhibiting various functions by the application method.

In particular, an object of the present invention is to provide a method for producing a transparent conductive film having a transparent conductive layer of low electric resistance value by the application method. Further, an object of the present invention is to provide a method for producing a transparent conductive film in which a conductive layer can be formed without a heating treatment of high temperature and a uniform conductive layer without thickness unevenness can be obtained, and a method for producing a transparent conductive film that can meet the increase in the area of the conductive layer.

Conventionally, in the application method, it was considered that a functional layer cannot be formed without the use of a large amount of binder resin, or in the case where binder resin is not used, the functional layer cannot be obtained unless a functional substance is sintered at a high temperature.

With respect to conductive layers, it was considered that a conductive layer cannot be formed without the use of a large amount of binder resin, or in the case where binder resin is not used, the conductive layer cannot be obtained unless a conductive substance is sintered at a high temperature.

Nevertheless, surprisingly as a result of eager studies made by the present inventor, it has been found out that functional layers having mechanical strength and being capable of exhibiting various functions can be obtained by compression even without the use of a large amount of binder resin and without calcining at a high temperature. The present inventor have found out that a transparent conductive layer having a low electric resistance value can be obtained with the use of a conductive material.

Namely, the present inventor has discovered a method for producing a functional film which comprises a functional layer comprising a compressed layer of functional fine particles on a support, said method comprising the steps of applying a liquid in which the functional fine particles are dispersed onto the support and drying the liquid to form a layer containing the functional fine particles, and thereafter compressing said layer containing the functional fine particles to form the compressed layer of the functional fine particles.

As a result of further studies made by the present inventor, it has been found out that a functional film which comprises a functional layer comprising a compressed layer of functional fine particles formed on a support can be obtained by first forming a layer containing the functional fine particles on a transfer support, and then, when compressing said layer containing the functional fine particles, transferring said layer to the support.

Namely, the present invention is a method for producing a functional film which comprises at least a functional layer comprising a compressed layer of functional fine particles on a support, said method comprising the steps of:

applying a liquid in which the functional fine particles are dispersed onto a transfer support and drying the liquid to form a transfer precursor film having a layer containing the functional fine particles formed on the transfer support;

superposing the support on which the functional layer is to be formed and said transfer precursor film so that the support and said layer containing the functional fine particles are brought into contact with each other, and compressing said layer containing the functional fine particles to form the compressed layer of the functional fine particles on the support; and thereafter releasing the transfer support from said compressed layer of the functional fine particles.

The present invention is the method for producing a functional film, wherein a surface of the support on which the functional layer is to be formed is softer than a surface of the transfer support on which the layer containing the functional fine particles is to be formed.

The present invention is the method for producing a functional film, wherein said layer containing the functional fine particles is compressed with a compression force of at least 44 N/mm$^2$.

The present invention is the method for producing a functional film, wherein said layer containing the functional fine particles is compressed at such a temperature that said support and said transfer support are not deformed.

The present invention is the method for producing a functional film, wherein said layer containing the functional fine particles is compressed using a roll press machine.

The present invention is the method for producing a functional film, wherein said transfer support has a hard-coating layer on a surface thereof on which the layer containing the functional fine particles is to be formed.

The present invention is the method for producing a functional film, wherein said support is a film made of resin.

The present invention is the method for producing a functional film, wherein said functional fine particles are selected from inorganic fine particles.

The present invention is the method for producing a functional film, wherein the functional layer is selected from the group consisting of a conductive layer, an ultraviolet shielding layer, an infrared shielding layer, a magnetic layer, a ferromagnetic layer, a dielectric layer, a ferroelectric layer, an electrochromic layer, an electroluminescent layer, an insulating layer, alight-absorbing layer, a light selecting absorbing layer, a reflecting layer, a reflection preventing layer, a catalyst layer and a photocatalyst layer.

If the aforesaid functional layer is a conductive layer, conductive fine particles are used as the aforesaid functional fine particles. The present invention is, in the method for producing a functional film, a method for producing a conductive film, wherein conductive fine particles are used as said functional fine particles to form a conductive layer.

The present invention is the method for producing a conductive film, wherein inorganic conductive fine particles used as said conductive fine particles are selected from the group consisting of tin oxide, indium oxide, zinc oxide, cadmium oxide, antimony-doped tin oxide (ATO), fluorine-doped tin oxide (FTO), tin-doped indium oxide (ITO) and aluminum-doped zinc oxide (AZO).

In the present invention, although the dispersion liquid of the functional fine particles may contain a small amount of a resin, it is particularly preferable that the dispersion liquid does not contain the resin. In the case that the dispersion liquid of the functional fine particles contains the resin, a content of the resin is preferably lower than 25 parts by volume with respect to 100 parts by volume of the functional fine particles. Particularly in the production of conductive films, it is preferable that the dispersion liquid of the functional fine particles does not contain the resin in that a conductive layer having a low electric resistance value can be obtained.

According to the present invention, a functional film is obtained by a simple operation of applying a paint which contains functional fine particles onto a transfer support and drying it to form a transfer precursor film, superposing a support on which a functional layer is to be formed and said transfer precursor film, and compressing it. The functional layer according to the present invention has a sufficient mechanical strength and the disadvantage caused by binder resin in the conventional application method is eliminated, so that as a result the intended function is further improved.

According to the present invention, a transparent conductive film is obtained by a simple operation of applying a conductive paint onto a transfer support and drying it to form a transfer precursor film, superposing a support on which a conductive layer is to be formed and said transfer precursor film, and compressing it. The transparent conductive layer according to the present invention has an excellent conductivity and an excellent transparency. Further, it has a sufficient mechanical strength, and the adhesion between the conductive layer and the support is firm, so that it can be used for a long period of time.

Also, according to the method of the present invention, it can meet an increase in the area of the conductive film, the apparatus is simple and has a high productivity, and various functional films including a transparent conductive film can be produced at a low cost.

DETAILED DESCRIPTION OF THE INVENTION

In the present invention, the functional layers are not particularly limited, and include layers having various functions such as a conductive layer, an ultraviolet shielding layer, an infrared shielding layer, a magnetic layer, a ferromagnetic layer, a dielectric layer, a ferroelectric layer, an electrochromic layer, an electroluminescent layer, an insulating layer, a light-absorbing layer, a light selecting absorbing layer, a reflecting layer, a reflection preventing layer, a catalyst layer, a photocatalyst layer and the like. Therefore, in the present invention, functional fine particles are used to constitute the aforesaid intended layers. The functional fine particles to be used are not particularly limited and may be mainly inorganic fine particles having an agglomeration force. In the production of any of the functional films, by applying a method of the present invention, a functional coating layer having a sufficient mechanical strength can be obtained, and the disadvantage, caused by a binder resin in the conventional application method that makes use of a large amount of the binder resin, can be eliminated. As a result, the intended function is further improved.

For example, in the production of a transparent conductive layer, conductive inorganic fine particles are used such as tin oxide, indium oxide, zinc oxide, cadmium oxide, antimony-doped tin oxide (ATO), fluorine-doped tin oxide (FTO), tin-doped indium oxide (ITO), aluminum-doped zinc oxide (AZO), or the like. In view of obtaining a more excellent conductivity, ITO is preferable. Alternatively, those in which the surface of fine particles such as barium sulfate having transparency is coated with an inorganic material such as ATO, ITO, or the like may be used. The particle diameter of these fine particles differs depending on the degree of scattering required in accordance with the usage of the conductive film, and may generally vary depending on the shape of the particles; however, it is generally 10 μm or less, preferably 1.0 μm or less, more preferably from 5 nm to 100 nm.

Alternatively, organic conductive fine particles may be used. As the organic conductive fine particles, for example, those in which the surface of the resin fine particles is coated with a metal material, and others may be mentioned.

By application of the production method in the present invention, an excellent conductivity is obtained. In the present invention, transparency means transmittance of visible light. With respect to the degree of scattering of light, desired level differs depending on the usage of the conductive layer. In the present invention, those generally referred to as being translucent and having a scattering are also included.

In the production of the ferromagnetic layer, iron oxide type magnetic powders such as $\gamma$-$Fe_2O_3$, $Fe_3O_4$, Co—$FeO_x$, Ba ferrite, etc., ferromagnetic alloy powders containing a ferromagnetic metal element such as $\alpha$-Fe, Fe—Co, Fe—Ni, Fe—Co—Ni, Co, Co—Ni, etc. as a major component, or the like is used. By application of the production method in the present invention, the saturation magnetic flux density of the magnetic coating layer is improved.

In the production of the dielectric layer or the ferroelectric layer, dielectric or ferroelectric fine particles such as magnesium titanate type, barium titanate type, strontium titanate type, lead titanate type, lead titanate zirconate type (PZT), lead zirconate type, lanthanum-doped lead titanate zirconate type (PLZT), magnesium silicate type, a lead-containing perovskite compound, or the like are used. By application of the production method in the present invention, dielectric properties or ferroelectric properties are improved.

In the production of a metal oxide layer that exhibits various functions, fine particles of metal oxide such as iron oxide ($Fe_2O_3$), silicon oxide ($SiO_2$), aluminum oxide ($Al_2O_3$), titanium dioxide ($TiO_2$), titanium oxide (TiO), zinc oxide (ZnO), zirconium oxide ($ZrO_2$), tungsten oxide ($WO_3$), or the like are used. By application of the production method in the present invention, the packing density of metal oxide in the layer increases to improve various functions. For example, if $SiO_2$ or $Al_2O_3$ carrying a catalyst is used, a porous catalyst layer having a practicable strength is obtained. If $TiO_2$ is used, a photocatalyst function is improved. Further, if $WO_3$ is used, an improvement of chromophoric action in an electrochromic display element is obtained.

Further, in the production of the electroluminescent layer, fine particles of zinc sulfide (ZnS) are used. By application of the production method in the present invention, an inexpensive electroluminescent layer can be produced by the application method.

In the present invention, a liquid in which functional fine particles selected from the above-mentioned various functional fine particles are dispersed therein is used as a functional paint in accordance with the objects.

The liquid for dispersing the functional fine particles such as conductive fine particles or the like is not particularly limited, and various known liquids may be used. For example, as the liquid, saturated hydrocarbons such as hexane, aromatic hydrocarbons such as toluene and xylene, alcohols such as methanol, ethanol, propanol and butanol, ketones such as acetone, methyl ethyl ketone, methyl isobutyl ketone and diisobutyl ketone, esters such as ethyl acetate and butyl acetate, ethers such as tetrahydrofuran, dioxane and diethyl ether, amides such as N,N-dimethylformamide, N-methylpyrrolidone (NMP) and N,N-dimethylacetamide, halogenated hydrocarbons such as ethylene chloride and chlorobenzene, and others may be mentioned. Among these, liquids having a polarity are preferable, and in particular, alcohols such as methanol and ethanol, and amides such as NMP having an affinity with water are suitable because the dispersion is good without the use of a dispersant. These liquids can be used either alone or as a mixture of two or more kinds thereof. Further, a dispersant may be used depending on a kind of the liquid.

Also, water can be used as the liquid. If water is used as the liquid, the transfer support must be hydrophilic. The resin film is usually hydrophobic and water-repellent, so that a uniform layer is not likely to be obtained. If the transfer support is the resin film, it is necessary to mix an alcohol with water or to make a hydrophilic surface of the transfer support.

The amount of the liquid to be used is not particularly limited, and may be such that the dispersion liquid of the fine particles has a viscosity suitable for application as described below. For example, 100 to 100,000 parts by weight of the liquid is used with respect to 100 parts by weight of the fine particles. The amount of the liquid may be suitably selected in accordance with kinds of the fine particles and the liquid. Generally, according as the particle diameter of the fine particles becomes small, the specific surface area of the fine particles becomes large, thereby the viscosity of the dispersion liquid tends to become high. When the fine particles having large specific surface area are used, a larger amount of the liquid is preferably used to reduce the solid concentration in the dispersion liquid. Further, when the intended thickness of the coating film is small, the dispersion liquid with a low solid concentration by using a larger amount of the liquid is preferably used.

The dispersion of the fine particles into the liquid may be carried out by a known dispersion technique. For example, the dispersion is carried out by the sand grinder mill method. At the time of dispersion, use of a medium such as zirconia beads is also preferable in order to loosen the agglomeration of the fine particles. Further, at the time of dispersion, one must take care not to mix impurities such as dust.

It is preferable that the dispersion liquid of the fine particles does not contain resin. In other words, the amount of resin is preferably zero. If the dispersion liquid of the fine particles does not contain resin, the layer containing the functional fine particles (before compression), which layer is formed on the transfer support by application, does not contain resin, either.

In the conductive layer, if resin is not used, the contact between the conductive fine particles is not inhibited by the resin. Therefore, the electric conductivity among the conductive fine particles is ensured, and the electric resistance value of the obtained conductive film is low. Resin can be contained in an amount that does not deteriorate the conductivity; however, the amount is extremely small as compared with the amount of resin used as a binder resin in the prior art. For example, the upper limit of resin contained in the dispersion liquid is less than 25 parts by volume with respect to 100 parts by volume of the conductive fine particles as represented by volume before dispersion. In the prior art, one has to use a large amount of binder in order to obtain a mechanical strength of the coating film, since strong compression is not carried out. If a resin is used in such an amount as to function as a binder, the contact between the conductive fine particles is inhibited by the binder, and the migration of electrons among the fine particles is inhibited to reduce the electric conductivity.

On the other hand, the resin has an effect to improve a haze of the conductive layer. However, in view of the conductivity, the resin is used preferably in a range of less than 25 parts by volume, more preferably in a range of less than 20 parts by volume, with respect to 100 parts by volume of the conductive fine particles as represented by volume before dispersion. Although the effect to improve the haze decreases, it is the most preferable not to use the resin in view of the conductivity.

In the functional layers using the other functional fine particles including $WO_3$ fine particles, $TiO_2$ fine particles, or the like, if resin is not used, the contact between the fine particles is not inhibited by the resin, so that an improvement is achieved in various functions. Resin can be contained in an amount that does not inhibit the contact between the fine particles and does not deteriorate the various functions; however, the amount is, for example, at most about 80 parts by volume with respect to 100 parts by volume of the respective fine particles.

In the catalyst layer using $Al_2O_3$ fine particles or the like, if resin is not used, the surface of the fine particles having a catalyst function is not covered with the resin. Therefore, the function as the catalyst is improved. In the catalyst layer, the larger the number of voids is in the inside of the layer, the larger the number of active points as the catalyst. In view of this point, it is preferable not to use resin as much as possible.

Thus, it is preferable not to use resin at the time of compression (namely, in the dispersion liquid of the functional fine particles); and even if resin is used, it is preferably used in a small amount. The amount of the resin to be used may be suitably determined because the amount may vary to some extent depending on the object of the functional layer.

Various additives may be blended with the dispersion liquid of the fine particles within a range that satisfies the performance required in the function such as conductivity or catalyst action. For example, additives such as an ultraviolet absorber, a surfactant, and a dispersant may be blended.

In the present invention, the dispersion liquid of the functional fine particles such as the conductive fine particles is applied onto the transfer support, and then the liquid is dried to form a layer containing the functional fine particles such as a layer containing the conductive fine particles on the transfer support.

The transfer support is not particularly limited, and various ones such as resin film, metal, cloth, paper, and others may be used. However, it is preferable to use ones that are not cracked in a later step of compression and have flexibility that facilitates easy peel off after compression. The transfer support to be used can be in a film form, foil form, mesh form, fabric form, or the like.

The transfer support is suitably a flexible resin film that is not cracked even if the compression force of the compression step is increased. The resin film is lightweight, can be easily handled, and can be easily released after compression. In the present invention, since a pressing step at a high temperature or a calcining step is not carried out, the resin film may be used as the transfer support.

As the resin film, for example, polyester film such as polyethylene terephthalate (PET), polyolefin film such as polyethylene or polypropylene, polycarbonate film, acrylic film, norbornene film (Arton manufactured by JSR Co., Ltd., or the like), and others may be mentioned.

In the present invention, the transfer support may have a hard-coating layer on a surface on which the layer containing the functional fine particles is to be formed. When the layer containing the functional fine particles is formed on the hard-coating layer of the transfer support, since the functional fine particles are not embedded in the hard-coating layer in the subsequent compression step, the adhesion between the functional fine particles and the transfer support does not become strong, so that the adhesion between the functional fine particles and the support becomes stronger. As a result, the layer containing the functional fine particles is easily transferred from the transfer support to the support.

The hard-coating layer can be formed by applying a liquid in which a hard-coating material is dissolved into a solvent in accordance with the needs onto a transfer support base, drying the applied liquid and curing it.

The hard-coating material is not particularly limited, and various known hard-coating materials may be used. For example, a thermosetting hard-coating material such as silicone type, acrylic type and melamine type may be used. Among these, the silicone type hard-coating material is excellent in view of obtaining high hardness.

Further, an ultraviolet-curable type hard-coating material including a radical-polymerizing hard-coating material such as unsaturated polyester resin type and acrylic type, a cation-polymerizing hard-coating material such as epoxy type and vinyl ether type, and others may be used. In view of productivity such as curing reactivity, the ultraviolet-curable type hard-coating material is preferable. Among these, in views of curing reactivity and surface hardness, the acrylic type radical-polymerizing hard-coating material is desirable.

Application of the hard-coating material may be performed by a known method such as a roll coater including gravure cylinder, reverse, and Meyer bar, a slit die coater, or others.

After the application, the applied one is dried at a suitable range of temperature, and then cured. In the case of the thermosetting hard-coating material, by providing suitable heat, for example, the silicone type hard-coating material applied is cured by heating at about 60° C. to 120° for 1 minute to 48 hours. In the case of the ultraviolet-curable type hard-coating material, ultraviolet rays are irradiated for curing. The ultraviolet rays may be irradiated by irradiating ultraviolet rays for about 200 to 2000 $mJ/cm^2$ with the use of a lamp such as a xenon lamp, a low pressure mercury-vapor lamp, a middle pressure mercury-vapor lamp, a high pressure mercury-vapor lamp, a super high pressure mercury-vapor lamp, a metal halide lamp, a carbon arc lamp, or a tungsten lamp. A thickness of the hard-coating layer is, for example, about 0.5 to 20 μm, preferably about 2 to 5 μm.

The application of the dispersion liquid of the functional fine particles onto the transfer support is not particularly limited, and may be carried out by a known method. For example, the application of the dispersion liquid having a high viscosity of 1,000 cps or more may be carried out by the application methods such as the blade method, the knife method, or the like. The application of the dispersion liquid having a low viscosity of less than 500 cps may be carried out by the application methods such as the bar coat method, the kiss coat method, the squeeze method, or the like. Also, in case of the dispersion liquid having a low viscosity, the dispersion liquid can be allowed to adhere onto the support by atomizing, spraying, or the like. Further, independently of viscosity of the dispersion liquid, it is possible to use the application methods such as the reverse roll method, the direct roll method, the extrusion nozzle method, the curtain method, the gravure roll method, the dip method, or the like.

The drying temperature is preferably about 10 to 150° C. although it depends on the type of the liquid used for dispersion. If the temperature is lower than 10° C., condensation of moisture in air is liable to occur, whereas if it exceeds 150° C., the resin film support will be deformed. Also, at the time of drying, one must take care not to allow impurities to adhere to the surface of the fine particles.

The thickness of the layer containing the functional fine particles after application and drying may be about 0.1 to 10 μm, though it depends on the compression condition in the next step or on the usage of various functional layers such as the conductive layer finally obtained after compression and transfer to the support.

Thus, if the functional fine particles such as the conductive fine particles are dispersed in liquid for application and drying, it is easy to form a uniform film. If the dispersion liquid of the fine particles is applied and dried, the fine particles form a film even if a binder is not present in the dispersion liquid. The reason why the film is formed even in the absence of a binder is not necessarily clear; however, when the amount of liquid decreases by drying, the fine particles gather by a capillary force. Further, it seems that, since they are fine particles, the specific surface area is large and the agglomeration force is strong to form a film. However, the strength of the film at this stage is weak. Also, in the conductive layer, it has a high electric resistance value and has a large variation of electric resistance value.

As described above, the layer containing the functional fine particles is formed on the transfer support to obtain a transfer precursor film.

Next, compressing the layer containing the functional fine particles of the transfer precursor film, the layer is transferred to the support on which the functional layer is to be formed.

The support on which the functional layer is to be formed is not particularly limited, and various ones such as resin film, metal, cloth, paper, and others may be used. However, it is preferable to use ones that are not cracked in the compression step. The support to be used can be in a film form, foil form, mesh form, fabric form, or the like.

A surface of the support on which the functional layer is to be formed is preferably softer than a surface of the transfer support on which the layer containing the functional fine particles is to be formed. In the compression step, the adhesion between the functional fine particles and the support becomes stronger than the adhesion between the functional fine particles and the transfer support, and as a result the layer containing the functional fine particles is easily transferred from the transfer support to the support.

The support is suitably a flexible resin film that is not cracked even if the compression force of the compression step is increased. The resin film is lightweight and can be easily handled. In the present invention, since a pressing step at a high temperature or a calcining step is not carried out, the resin film may be used as the support. As the resin film, the films, which can be used as the transfer support, can be used. Further, if necessary, it may be subjected to corona discharge treatment or easy-adhesion treatment.

In the present invention, the support may have a resin layer on the surface on which the functional layer is to be formed. It is required that the resin layer has a softness of the degree by which a part of the functional fine particles are embedded in the resin layer in the compression step to form the compressed layer of the functional fine particles with good adhesive properties on the resin layer. Consequently, the resin layers are preferably softer than, for example, pencil hardness of 2H. The degree of the softness required for the resin layers varies depending on a hardness of the surface of the transfer support (if formed, a hardness of the hard-coating layer), a kind or a particle diameter of the functional fine particles, compression force or the like.

For the resin layers of the support, soft resins may be used, and as the soft resins, for example, resins capable of obtaining relatively low hardness are used from acrylic resins, urethane resins, vinyl chloride resins, silicone resins or the like. The resin layers may contain fine particles such as silica for controlling hardness of the resin layers, or filler for coloring or absorbing ultraviolet rays, in a range that does not give bad influences to adhesive properties. After compression, the soft resin layers may be cured by heat or ultraviolet rays. For example, the hard-coating material may be used as this resin layer since the material is soft before curing. And it may be a hard-coating layer by carrying out curing treatment after compression.

In the present invention, it is unnecessary to directly apply the dispersion liquid of the functional fine particles onto the surface on which the functional layer is to be formed. Accordingly, for example, even if the resin layer is soluble in the dispersion liquid, there is an advantage that the compressed layer can be formed on the resin layer without being dissolved by the dispersion liquid.

The support on which the functional layer is to be formed and the transfer precursor film are superposed so that the support and the layer containing the functional fine particles of the transfer precursor film are brought in contact with each other, and the layer containing the functional fine particles such as the layer containing the conductive fine particles is compressed to form the compressed layer of the functional fine particles such as the conductive fine particles on the support.

The compression improves the strength of the layer. Namely, the compression increases the number of contact points among the functional fine particles such as the conductive fine particles to increase the contact area. For this reason, the strength of the coating layer is increased. Since the fine particles are originally liable to be agglomerated, the compression makes a firm layer.

In the conductive layer, the strength of the coating layer increases and the electric resistance decreases. In the catalyst layer, the strength of the coating layer increases and the layer will be a porous layer, since the resin is not used or used in a small amount. Therefore, a higher catalyst function is obtained. In the other functional layers, the layer can be made into a layer having a high strength in which the fine particles are connected with each other, and also the filling amount of the fine particles per unit volume will be large, since the resin is not used or used in a small amount. For this reason, a higher function is obtained in each layer.

The compression improves the strength of the layer, and the layer containing the functional fine particles is transferred from the transfer support side to the support side.

The compression is preferably carried out at a compression force of at least 44 $N/mm^2$. If it is carried out at a low pressure of less than 44 $N/mm^2$, the layer containing the functional fine particles such as the layer containing the conductive fine particles cannot be fully compressed and, it is difficult to obtain the functional layer such as the conductive layer with excellent functionality such as conductivity. A compression force of at least 138 $N/mm^2$ is more preferable, and a compression force of at least 183 $N/mm^2$ is still more preferable. According as the compression force is higher, the strength of the coating layer is improved, and the adhesive properties to the support will be improved. In the conductive layer, a layer with more excellent conductivity is obtained, the strength of the conductive layer is improved, and the adhesive properties between the conductive layer and the support will be firm. According as the compression force is raised, the pressure resistance of the apparatus must be raised, so that a compression force up to 1000 $N/mm^2$ is generally suitable.

Further, the compression is preferably carried out at such a temperature that the support and the transfer support are not deformed. If a resin film is used as the support and/or the transfer support, for example, it will be a temperature range below the glass transition temperature (secondary transition temperature) of the resin. If the support is made of metal, it will be a temperature rage such that the metal is not be melted.

The compression is not particularly limited and may be carried out by sheet press or roll press; however, it is preferably carried out by means of a roll press machine. The roll press is a method in which the film to be compressed is sandwiched between rolls for compression and the rolls are rotated. The roll press is suitable because a high uniform pressure can be applied in the roll press, and the productivity of the roll press is higher than that of the sheet press.

The roll temperature of the roll press machine is preferably an ordinary temperature (an environment suitable for human work) from the viewpoint of productivity. If the compression is carried out in a heated atmosphere or with heated rolls (hot press), there will be a disadvantage such that the resin film is elongated when the compression pressure is increased. If the compression pressure is reduced in order to prevent the resin film from being elongated under heating, the mechanical strength of the coating layer decreases. In the conductive layer, the mechanical strength of the coating layer decreases and the electric resistance rises. It is also preferable to control the temperature so that the roll temperature may not rise by heat generation in the case where continuous compression is carried out by means of the roll press machine.

If there is a reason to reduce the adhesion of moisture to the fine particle surface as much as possible, the heated atmosphere may be adopted in order to reduce the relative humidity of the atmosphere; however, the temperature range is within a range such that the film is not easily elongated. Generally, it will be a temperature range below the glass transition temperature (secondary transition temperature). By taking the variation of humidity into account, it may be set at a temperature which is a little higher than the temperature that achieves the required humidity.

If the support is made of metal, the heated atmosphere can be made within a temperature range such that the metal is not melted.

Here, the glass transition temperature of the resin film is determined by measuring the dynamic viscoelasticity, and refers to the temperature at which the dynamic loss of the main dispersion is at its peak. For example, with regard to PET film, its glass transition temperature is approximately around 110° C.

The roll of the roll press machine is preferably a metal roll because a strong pressure can be applied. Also, the roll surface may be treated with a hard film such as hard chromium, spraying film of ceramics, a film obtained by ionic plating Of TiN etc., DLC (diamond like carbon), or the like.

Subsequent to compression, the transfer support is released from the compressed layer of the functional fine particles.

As described above, the compressed layer of the functional fine particles such as the conductive fine particles is formed on the support. The thickness of the compressed layer of the functional fine particles such as the conductive fine particles may be about 0.05 to 10 μm, preferably 0.1 to 5 μm, more preferably 0.1 to 3 μm, and most preferably 0.1 to 2 μm, though it depends on the usage.

Further, in order to obtain a compressed layer having a thickness of about 10 μm, when forming the transfer precursor film, a series of operations including application of the dispersion liquid of the fine particles, drying, and compression may be carried out repeatedly. Furthermore, in the present invention, it is of course possible to form various functional layers such as the conductive layer on both surfaces of the support.

The various functional layers such as the transparent conductive layer thus obtained show various functionalities such as an excellent conductivity or catalyst action, has a practically sufficient film strength even though it is made without the use of a binder resin or with the use of a small amount of resin such that it does not function as a binder, and also has an excellent adhesion with the support.

In the producing method for the functional film of the present invention, it is possible to obtain the compressed layers of the functional fine particles comprising at least two different compressed layers of functional fine particles.

The multi-layer construction is obtained in the formation of the transfer precursor film by performing repeatedly a series of operations comprising applying a dispersion liquid of corresponding functional fine particles, drying the liquid to form a layer containing functional fine particles with multiple layers, and compressing it.

Further, it is also preferable to form two or more kinds of transfer precursor films each comprising a layer containing functional fine particles with a single layer, compress each of these layers containing functional fine particles and transfer each of these layers to the support one after the other.

In accordance with objects or usage of a multi-layer functional layer, multi-layer construction may be accomplished by combining two or more functional layers having different functions. For example, the multi-layer functional layers for solar batteries, electroluminescent elements, electrochromic elements or the like may be obtained by combining two or more functional layers.

For the solar batteries, specifically, a multi-layer construction comprising a transparent conductive layer, a transparent insulating layer, a semiconductive layer of chalcopyrite structure composed of groups 1, 3 and 4 elements, and a metal electrode in this order, is illustrated.

For distributed D.C. operating electroluminescent elements, multi-layer construction comprising a transparent conductive layer, an EL emission layer, a rear electrode in this order, is illustrated.

For permeable electrochromic elements, multi-layer construction comprising a transparent conductive layer, a first chromophoric layer, a dielectric layer, a second chromophoric layer and a transparent conductive layer in this order, is illustrated.

Besides these, various multi-layer constructions in accordance with various usages may be considered.

In case of the multi-layer construction, each layer that constitutes the multi-layer construction is not necessarily a compressed layer. For example, in the case of the solar batteries, the transparent conductive layer, the transparent insulating layer and the semiconductive layer may be formed by compression and the metal electrode may be formed by vacuum deposition.

EXAMPLES

Hereafter, the present invention will be described with reference to Examples thereof; however, the present invention is not limited to these Examples alone.

Figure 1:
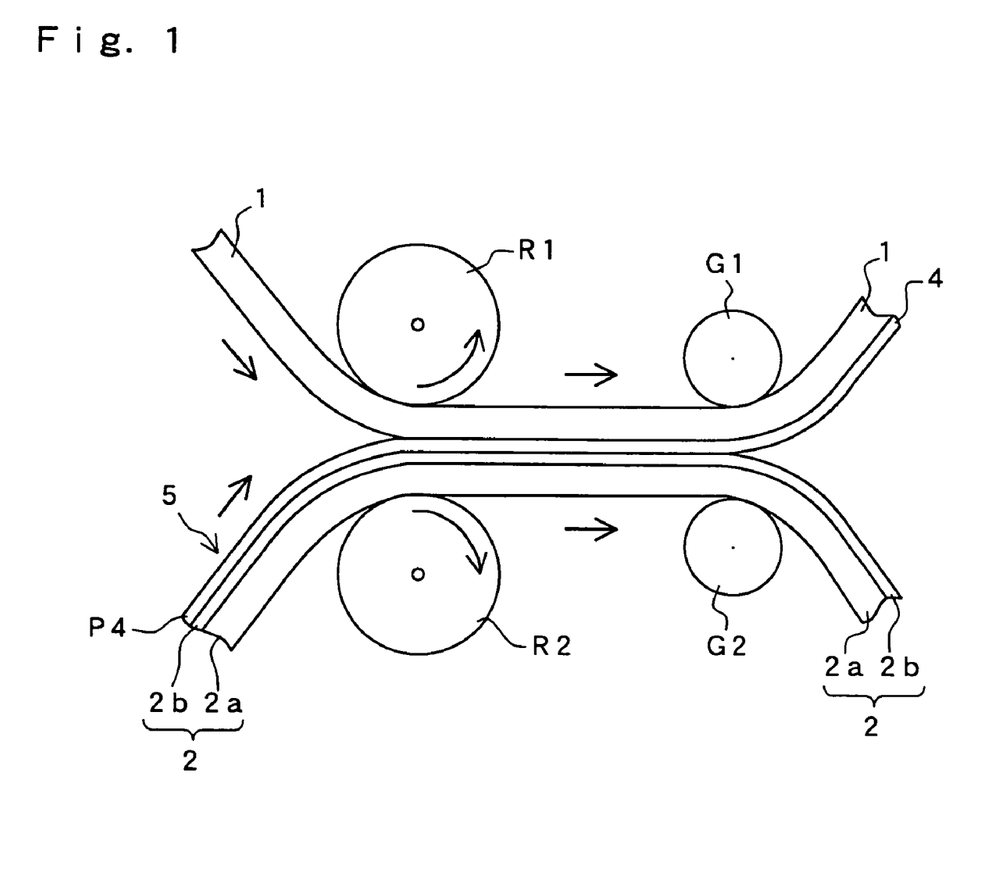
FIG. 1 is a view for describing a formation of a compressed layer in the production method of the present invention.

FIG. 1 is a view for describing a formation of a compressed layer in the production method of the present invention. In FIG. 1, a layer containing functional fine particles (P4) is formed on a transfer support (2) having a hard-coating layer (2b) formed on a base film (2a), thereby forming a transfer precursor film (5). A support (1) and the transfer precursor film (5) are superposed so that a surface of the support (1) on which a functional layer is to be formed and the layer containing the functional fine particles (P4) of the film (5) are brought into contact with each other, are sandwiched between a pair of press rolls (R1) and (R2) of a roll press machine and compressed. The layer containing the functional fine particles (P4) becomes a compressed layer (4) by compression. Thereafter, when the both (1) and (5) are passed through guide rollers (G1) and (G2) which are placed optionally, the transfer support (2) and the compressed layer (4) are released from each other, thereby forming the compressed layer (4) on the support (1) by transfer.

Examples 1 to 8 are examples in which ITO fine particles are used as conductive fine particles in order to obtain a transparent conductive film for use as an electroluminescence panel electrode.

Example 1

(Formation of the Transfer Support)

A silicone hard-coating liquid KP-854 (manufactured by Shin-Etsu Chemical Co., Ltd.) was applied onto a surface of a PET base film HPE with a thickness of 50 μm (manufactured by Teijin DuPont Films Co., Ltd.) (2a) which had been subjected to treatment for making adhesion easy, and the applied liquid was dried and cured at 70° C. for 48 hours to form a silicone hard-coating layer (2b) with a thickness of 1.5 μm, thereby forming the transfer support (2).

(Formation of the Transfer Precursor Film)

To 100 parts by weight of ITO fine particles having a primary particle diameter of 10 to 30 nm (manufactured by DOWA MINING Co., Ltd.) were added 300 parts by weight of ethanol, and dispersion was carried out by means of a dispersion machine with the use of zirconia beads as a medium. The obtained coating liquid was applied onto the hard-coating layer (2b) of the transfer support (2) by means of a bar coater and dried by supplying hot air of 50° C. to form a layer containing the ITO fine particles (P4). Thus, the transfer precursor film (5) was obtained. The layer containing the ITO fine particles (P4) had a thickness of 1.7 μm.

(The Support)

A PET film HSL with a thickness of 75 μm (manufactured by Teijin DuPont Films Co., Ltd.) was used as the support (1).

(Formation of the Compressed Layer)

The support (1) and the transfer precursor film (5) were superposed so that the support (1) and the layer containing the ITO fine particles (P4) were brought into contact with each other, and they were sandwiched and compressed by means of the roll press machine.

Prior to compression, firstly, a preliminary experiment for confirming the compression pressure was carried out.

By means of the roll press machine equipped with a pair of metal rolls having a diameter of 140 mm (whose roll surface had been subjected to hard chromium plating treatment), the support (1) and the transfer precursor film (5) were sandwiched and compressed at room temperature (23° C.) without rotating the rolls and without heating the rolls. At this time, the pressure per unit length in the film width direction was 1,000 N/mm. Next, the pressure was released and the length of the part compressed and transferred to the support in the film length direction was examined and found out to be 2 mm. From this result, it was found out that the film had been compressed by a pressure of 500 N/mm² per unit area.

Figure 3:
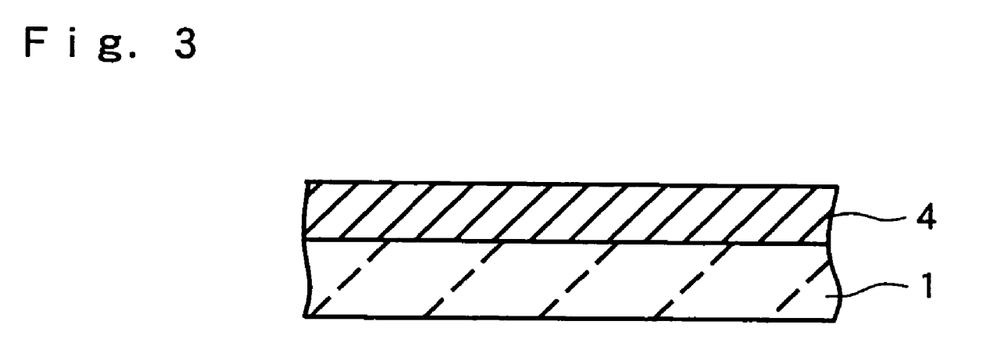
FIG. 3 is across-sectional view illustrating one example of a functional film obtained by the production method of the present invention.

Next, the support (1) and the transfer precursor film (5), which were the same ones as used in the preliminary experiment, were sandwiched between the metal rolls and compressed under the aforesaid condition, and the rolls were rotated to compress the film at a feeding speed of 5 m/min. After compression, the transfer support (2) was released from the compressed layer of the ITO fine particles (4) formed on the support (1). Thus, an ITO film (FIG. 3) having the compressed layer of the ITO fine particles (4) formed on the support (1) was obtained. The compressed layer of the ITO fine particles (4) had a thickness of 1.0 μm. Releasing was easily carried out, and the surface of the compressed layer of the ITO fine particles (4) was completely exposed.

(Electric Resistance)

The film having the compressed layer of the ITO fine particles (4) formed was cut into a size of 50 mm×50 mm. The electric resistance was measured by applying a tester to two points on diagonally positioned corners and was found out to be 3 kΩ.

(90° Peel Test)

A 90° peel test was carried out in order to evaluate the adhesion of the compressed layer of the ITO fine particles (4) to a support film (1) and the strength of the compressed layer (4). An explanation thereof will be given with reference to FIG. 2.

Figure 2:
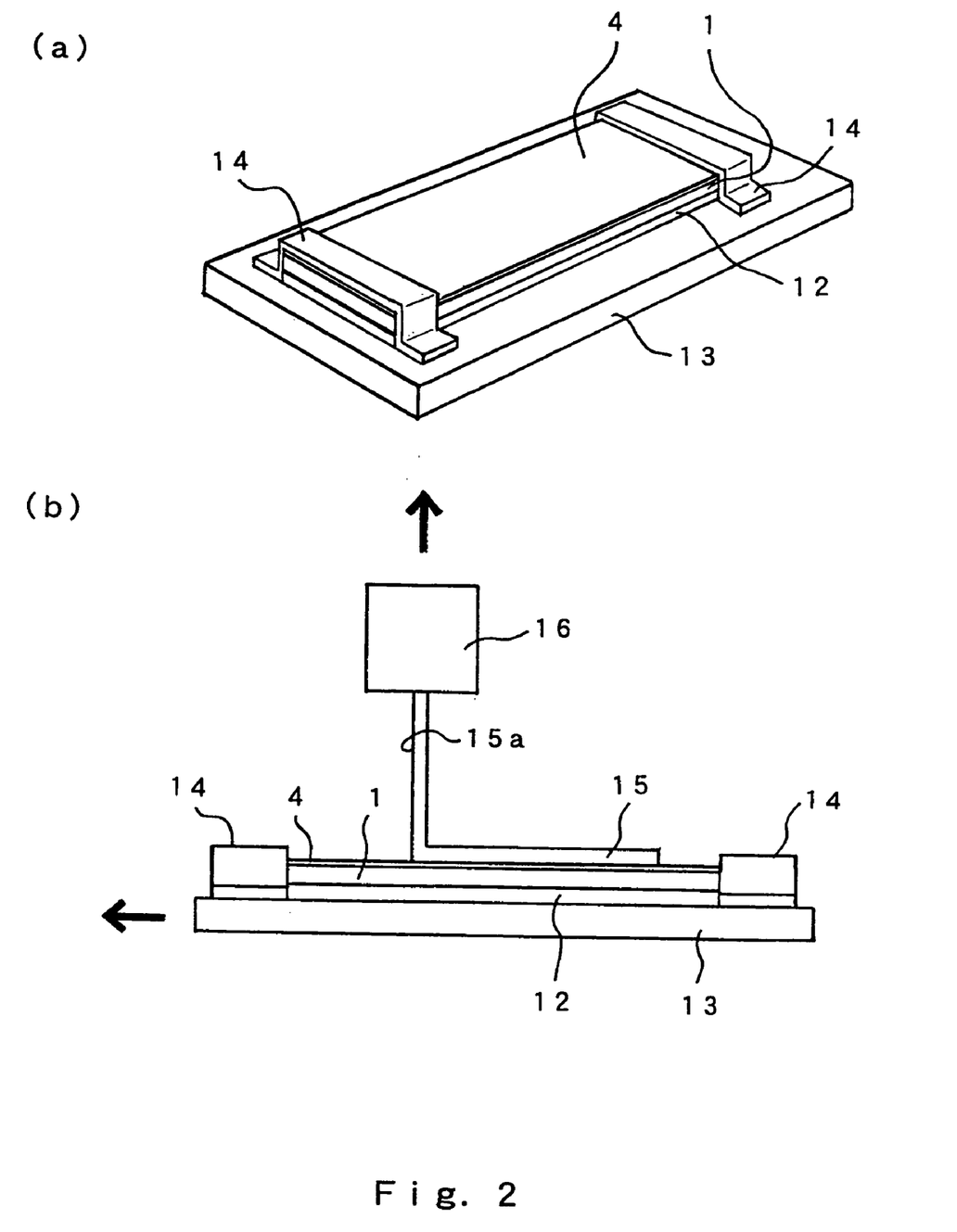
FIG. 2 is a view for describing a 90° peel test in the Examples of the present invention.

A double-sided adhesive tape (12) was stuck onto a surface of the support film (1) opposite to the surface having the compressed layer (4) formed thereon in a film having the compressed layer (4) formed. This was cut into a size of 25 mm×100 mm. This test sample was stuck onto a stainless steel plate (13). A cellophane adhesive tape (width 12 mm, No. 29, manufactured by Nitto Denko Corporation) (14) was stuck onto both ends (25 mm sides) of the sample so that the test sample would not be peeled off (FIG. 2(a)).

A cellophane adhesive tape (width 12 mm, No. 29, manufactured by Nitto Denko Corporation) (15) was stuck onto the compressed layer (4) of the test sample so that the tape (15) would be parallel to the longitudinal side of the sample. The stuck length of the cellophane tape (15) and the sample was 50 mm. The end portion of the tape (15) which was not stuck was attached to a tension gage (16), and the test sample was set so that the angle formed between the stuck surface and the non-stuck surface (15a) of the cellophane tape (15) would be 90°. The cellophane tape (15) was pulled and peeled off at a speed of 100 mm/min. At this time, the speed at which the tape (15) was peeled off was made equal to the speed at which the stainless steel plate (13) having the test sample stuck thereon moved so that the angle formed between the non-stuck surface (15a) of the cellophane tape (15) and the test sample surface would always be 90°. The force (F) needed in peeling was measured by the tension gage (16) (FIG. 2(b)).

After the test, the surface of the peeled compressed layer (4) and the surface of the cellophane tape were examined. If the adhesive remained on both of the surfaces, it means that an adhesive layer of cellophane tape was destroyed and not that the compressed layer (4) was destroyed. Namely, it means that the strength of the adhesive was a value of the force (F) needed in peeling, so that the strength of the compressed layer (4) was equal to or more than the value (F).

In the present test, since the upper limit of the strength of the adhesive is 6 N/12 mm, those represented as 6 N/12 mm in Table 1 are cases in which the adhesive remained on both surfaces as described above, and indicate that the adhesion and the strength of the compressed layer (4) are at least 6 N/12 mm. In the cases of a value smaller than this, the adhesive is absent on the surface of the compressed layer (4), and a part of the compressed layer adhered to the surface of the cellophane tape, and it is indicated that the destruction occurred in the compressed layer (4) at that value. If the value is 3 N/12 mm or more, the adhesion and the strength of the compressed layer (4) are at practical use level.

From the result of the above 90° peel test, it was found out that a force of 6 N/12 mm was needed in peeling the cellophane tape off in Example 1. On examination of the surface of the compressed layer (4) after the peel test, the adhesive of the cellophane tape adhered on the surface. The adhesive surface of the peeled cellophane tape was examined and found out to have adhesiveness. Therefore, the strength of the compressed layer (4) was at least 6 N/12 mm.

Examples 2 to 6

A compressed ITO film was obtained in the same manner as in Example 1 except that the compression was carried out by changing the compression pressure respectively to the values shown in Table 1. The electric resistance was measured and the 90° peel test was carried out.

Comparative Example 1

For comparison, a physical property test was carried out on the transfer precursor film (5) having the layer containing the ITO fine particles (P4) formed of Example 1. The layer containing the ITO fine particles (P4) which had not been subjected to compression treatment had an electric resistance of 340 kΩ.

Example 7

A compressed ITO film was obtained in the same manner as in Example 2 except that the feeding speed at the time of compression was changed to 2.5 m/min. The electric resistance was measured and the 90° peel test was carried out.

Comparative Example 2

A resin solution was prepared by dissolving 100 parts by weight of polyvinylidene fluoride (PVDF) into 900 parts by weight of NMP. To 100 parts by weight of ITO fine particles having a primary particle diameter of 10 to 30 nm (manufactured by DOWA MINING Co., Ltd.) were added 1000 parts by weight of the resin solution and 900 parts by weight of NMP, and dispersion was carried out by means of a dispersion machine with the use of zirconia beads as a medium.

The obtained coating liquid was applied onto a PET film having a thickness of 50 μm by means of a bar coater and dried (100° C., 3 minutes), thereby to obtain an ITO film. The ITO coating layer had a thickness of 1.0 μm. The electric resistance was measured and the 90° peel test was carried out (the amount of PVDF was 383 parts by volume with respect to 100 parts by volume of the ITO fine particles).

The result of the 90° peel test was 3.4 N/12 mm. This is due to the fact that, since the amount of resin was large, PVDF oozed out onto the coating layer surface to cause decrease in adhesion of the cellophane tape onto the coating layer surface, so that the coating layer had not been destroyed. Therefore, the coating layer strength was at least 3.4 N/12 mm.

Example 8

(The Support)

A silicone hard-coating liquid KP-854 (manufactured by Shin-Etsu Chemical Co., Ltd.) was applied onto a surface of a PET film HPE with a thickness of 50 μm (manufactured by Teijin DuPont Films Co., Ltd.) (1) which had been subjected to treatment for making adhesion easy, and the applied liquid was dried to form an uncured silicone hard-coating layer (H) with a thickness of 2 μm.

(Formation of the Transfer Precursor Film)

The transfer support (2) having the silicone hard-coating layer (2b) formed on the PET base film (2a), which was the same one as used in the Example 1, was used. In the same manner as in Example 1, the layer containing the ITO fine particles (P4) was formed on the hard-coating layer (2b) of this transfer support (2) to obtain the transfer precursor film (5).

(Formation of the Compressed Layer)

Figure 6:
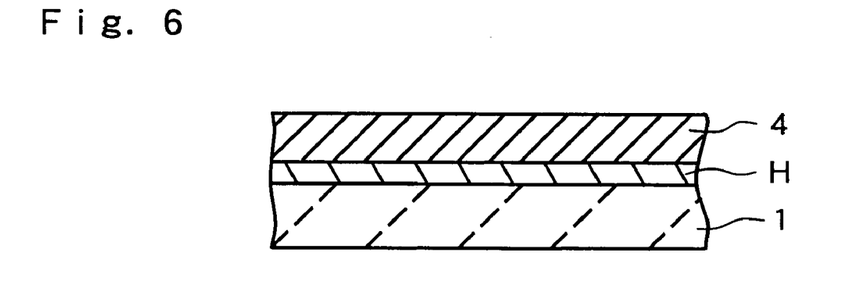
FIG. 6 is across-sectional view illustrating one example of a functional film obtained by the production method of the present invention.

The support (1) having the silicone hard-coating layer (H) formed thereon and the transfer precursor film (5) having the layer containing the ITO fine particles (P4) formed were superposed so that the silicone hard-coating layer (H) and the layer containing the ITO fine particles (P4) were brought in contact with each other, and then they were sandwiched and compressed by means of the roll press machine. The compression was carried out at a compression force of 347 N/mm$^2$. After compression, the transfer support (2) was released from the compressed layer of the ITO fine particles (4) formed on the support (1). Thus, an ITO film having the layer structure shown in FIG. 6, in which the silicone hard-coating layer (H) and the compressed layer of the ITO fine particles (4) were formed on the support (1), was obtained. Releasing was easily carried out, and a surface of the compressed layer of the ITO fine particles (4) was completely exposed.

Next, the ITO film was placed in an atmosphere of 100° C. for an hour to cure the uncured silicone hard-coating layer (H). The thickness of the compressed layer of the ITO fine particles (4) was 1.0 μm. The electric resistance was measured and the 90° peel test was carried out.

TABLE 1

|  | Conductive material | Amount of resin (parts by weight) | Pressure in the width direction (N/mm) | Compression length in the length direction (mm) | Pressure per unit area (N/mm$^2$) | Electric resistance value (kΩ) | 90° peel test |
|---|---|---|---|---|---|---|---|
| Example 1 | ITO | — | 1000 | 2 | 500 | 3 | 6N/12 mm |
| Example 2 | ITO | — | 660 | 1.9 | 347 | 4 | 6N/12 mm |
| Example 3 | ITO | — | 330 | 1.8 | 183 | 6 | 6N/12 mm |
| Example 4 | ITO | — | 165 | 1.2 | 138 | 8 | 5.4N/12 mm |
| Example 5 | ITO | — | 80 | 0.9 | 89 | 13 | 4.2N/12 mm |
| Example 6 | ITO | — | 40 | 0.9 | 44 | 22 | 3.4N/12 mm |
| Comparative Example 1 | ITO | — | 0 | 0 | 0 | 340 | — |
| Example 7 | ITO | — | 660 | 1.9 | 347 | 4 | 6N/12 mm |
| Comparative Example 2 | ITO | 100 | 0 | 0 | 0 | 210 | 3.4N/12 mm |
| Example 8 | ITO | — | 660 | 1.9 | 347 | 4 | 6N/12 mm |

The results of measurement of Examples 1 to 8 and Comparative Examples 1 to 2 are shown in Table 1. The conductive films of Examples 1 to 8 each had a low electric resistance value, had a large compressed layer strength, and was excellent in adhesion between the compressed layer and the support film.

From Examples 1 to 6, it was found out that, according as the pressing pressure increased, the electric conductivity became better, the strength of the compressed layer became larger, and the adhesion between the compressed layer and the support film became firm to such an extent that the adhesive of the cellophane tape remained on the conductive surface.

The conductive layer which contains no resin provided a more excellent electric conductivity than the conductive layer which contains resin. Also, the conductive films of Examples 1 to 8 each were excellent in transparency in terms of visible light transmittance.

In contrast, in Comparative Example 1, since the compression step was not carried out, the electric resistance value was higher as compared with those of Examples 1 to 6.

In Comparative Example 2, a large amount of binder resin was used so that the coating layer would be formed without compression as in the conventional case. Since the binder resin was used in a large amount, the strength of the coating layer was sufficient, but the electric resistance value was high.

Example 9

Formation of an ITO/TiO$_2$ Multi-Layer Functional Layer

This Example is an example for forming an ITO compressed layer on the support by transfer at first, and then forming a TiO$_2$ compressed layer on the ITO compressed layer by transfer. Formation of a multi-layer compressed layer in the production method of the present invention will be described with reference to FIG. 4 and FIG. 5.

1. Formation of the First Compressed Layer

Figure 4:
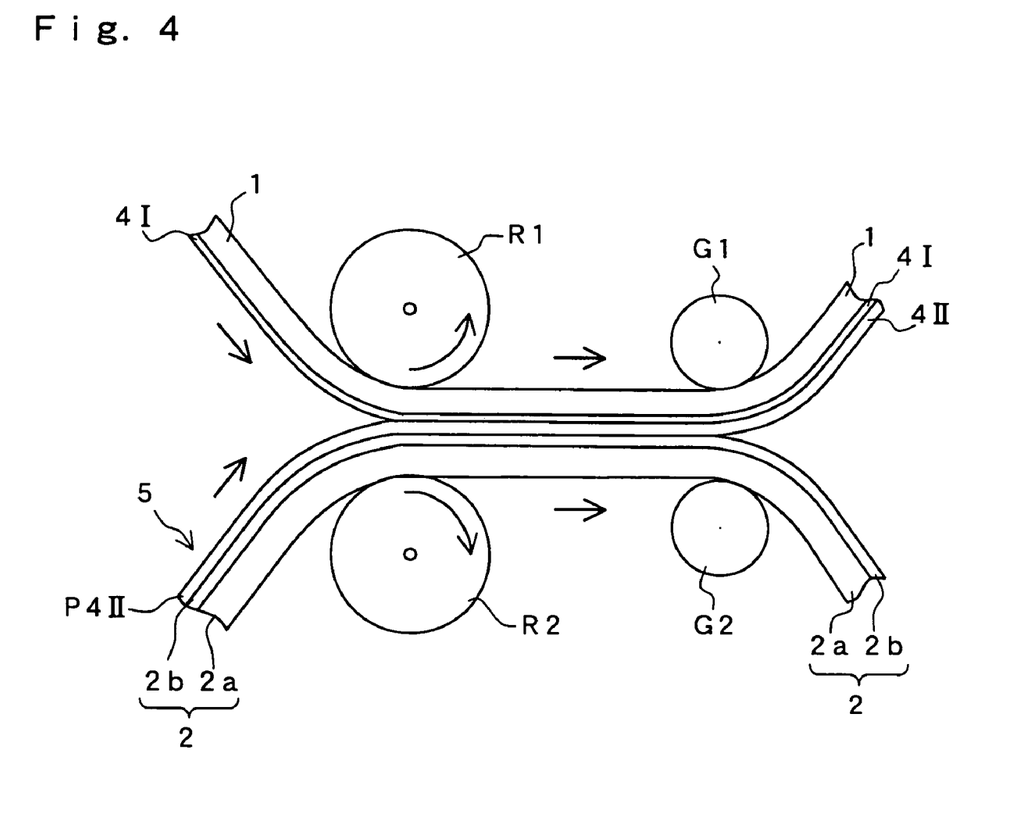
FIG. 4 is a view for describing a formation of a multi-layer compressed layer in the production method of the present invention.
Figure 5:
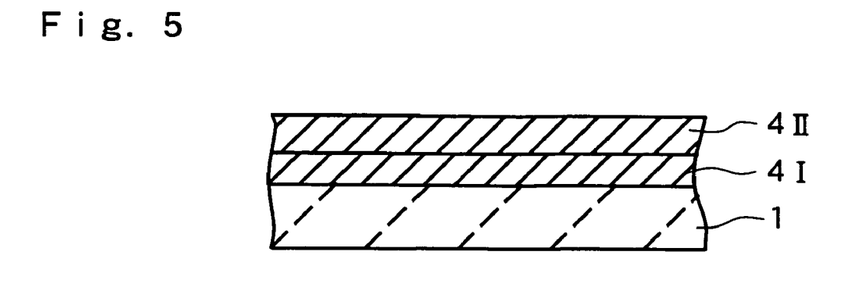
FIG. 5 is across-sectional view illustrating one example of a functional film having a multi-layer functional layer obtained by the production method of the present invention.

In the same manner as in Example 2, a compressed layer of ITO fine particles (4I) was formed on the support (1) as the first compressed layer. The compression was carried out at a compression force of 347 N/mm$^2$.

2. Formation of the Second Compressed Layer (The Transfer Support)

The transfer support (2) having the silicone hard-coating layer (2b) formed on the PET base film (2a), which was the same one as used in Example 1, was used.

(Formation of the Transfer Precursor Film)

To 100 parts by weight of TiO$_2$ fine particles having a primary particle diameter of 30 to 70 nm were added 900 parts by weight of ethanol, and dispersion was carried out by means of a dispersion machine with the use of zirconia beads as a medium. The obtained coating liquid was applied onto the hard-coating layer (2b) of the transfer support (2) by means of a bar coater and dried by supplying hot air of 50° C. to form a layer containing TiO$_2$ fine particles (P4II). Thus, the transfer precursor film (5) was obtained. The layer containing the TiO$_2$ fine particles (P4II) had a thickness of 0.7 μm.

(Formation of the Second Compressed Layer)

As shown in FIG. 4, the support (1) having the ITO compressed layer (4I) formed thereon and the transfer precursor film (5) having the layer containing the TiO$_2$ fine particles (P4II) were superposed so that the ITO compressed layer (4I) and the layer containing the TiO$_2$ fine particles (P4II) were brought into contact with each other, and then they were sandwiched and compressed by the roll press machine. The compression was carried out at a compression force of 347 N/mm$^2$. After compression, the transfer support (2) was released from the compressed layer of the TiO$_2$ fine particles (4II) formed on the support (1). Thus, an ITO/TiO$_2$ film having the layer structure shown in FIG. 5, in which the compressed layer of the ITO fine particles (4I) and the compressed layer of the TiO$_2$ fine particles (4II) are formed on the support (1), was obtained. The thickness of the compressed layer of the ITO fine particles (4I) was 1.0 μm, and the thickness of the compressed layer of the TiO$_2$ fine particles (4II) was 0.5 μm. Releasing was easily carried out, and a surface of the compressed layer of the TiO$_2$ fine particles (4II) was completely exposed.

(90° Peel Test)

As a result of the above 90° peel test, a force of 6 N/12 mm was needed in peeling the cellophane tape off. On examination of the surface of the compressed layer (4II) after the peel test, the adhesive of the cellophane tape adhered on the surface, and the destruction between the ITO compressed layer (4I) and the TiO$_2$ compressed layer (4II) was not occurred. The adhesive surface of the peeled cellophane tape was examined and found out to have adhesiveness. Therefore, the strength of the compressed layers (4I) and (4II) was at least 6 N/12 mm.

The obtained ITO/TiO$_2$ multi-layer functional film may be used for solar batteries.

Example 10

Formation of a Functional Film for Transfer

Figure 7:
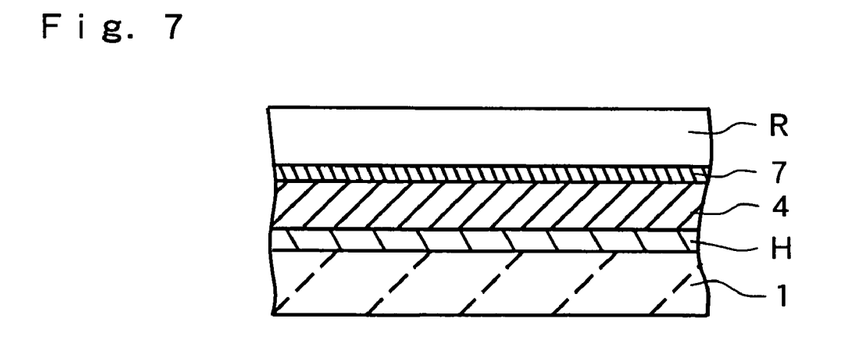
FIG. 7 is across-sectional view illustrating one example of a functional film for transfer, which is formed by using a functional film obtained by the production method of the present invention.

This Example is an example for forming an ITO film for transfer by using the compressed ITO film obtained by the method of the present invention, and transferring the ITO compressed layer of the ITO film for transfer to a polycarbonate base. This will be described with reference to FIG. 6 to FIG. 8.

1. Formation of the Compressed Layer (The Support)

A silicone hard-coating liquid KP-854 (manufactured by Shin-Etsu Chemical Co., Ltd.) was applied onto a PET film HSL with a thickness of 75 μm (manufactured by Teijin DuPont Films Co., Ltd.) (1), and the applied liquid was dried to form an uncured silicone hard-coating layer (H) with a thickness of 2 μm.

(Formation of the Transfer Precursor Film)

The transfer support (2) having the silicone hard-coating layer (2b) formed on the PET base film (2a), which was the same one as used in the Example 1, was used. In the same manner as in Example 1, the layer containing the ITO fine particles (P4) was formed on the hard-coating layer (2b) of, this transfer support (2) to obtain the transfer precursor film (5).

(Formation of the Compressed Layer)

The support (1) having the silicone hard-coating layer (H) formed thereon and the transfer precursor film (5) having the layer containing the ITO fine particles (P4) formed were superposed so that the silicone hard-coating layer (H) and the layer containing the ITO fine particles (P4) were brought into contact with each other, and then they were sandwiched and compressed by a roll press machine. The compression was carried out at a compression force of 347 N/mm$_2$. After compression, the transfer support (2) was released from the compressed layer of the ITO fine particles (4) formed on the support (1). Thus, an ITO film having the layer structure shown in FIG. 6, in which the silicone hard-coating layer (H) and the compressed layer of the ITO fine particles (4) are formed on the support (1), was obtained. Releasing was easily carried out, and a surface of the compressed layer of the ITO fine particles (4) was completely exposed.

Next, the ITO film was placed in an atmosphere of 100° C. for an hour to cure the uncured silicone hard-coating layer (H). The thickness of the compressed layer of the ITO fine particles (4) was 1.0 μm.

2. Formation of a Functional Film for Transfer (Formation of an Adhesive Layer)

To 100 parts by weight of the acrylic resin 1BR-305 (concentration of nonvolatile components: 39.5%; manufactured by Taisei Chemical Industries, Ltd.) were added 92 parts by weight of a UV curable resin SD-318 (manufactured by Dainippon Ink and Chemicals, Incorporated) and 137 parts by weight of methyl ethyl ketone to prepare a coating liquid for an adhesive layer. The coating liquid was applied onto a silicone release PET film S314(R) and dried to form an adhesive layer (7) with a thickness of 10 μm.

The ITO film obtained by the above 1 process and the silicone release PET film S314(R) having the adhesive layer (7) formed thereon were laminated together so that the ITO compressed layer (4) of the ITO film and the adhesive layer (7) were brought into contact with each other. Thus, the ITO film for transfer having the layer structure shown in FIG. 7 was formed.

3. Providing the Functional Layer to a Polycarbonate Base

Figure 8:
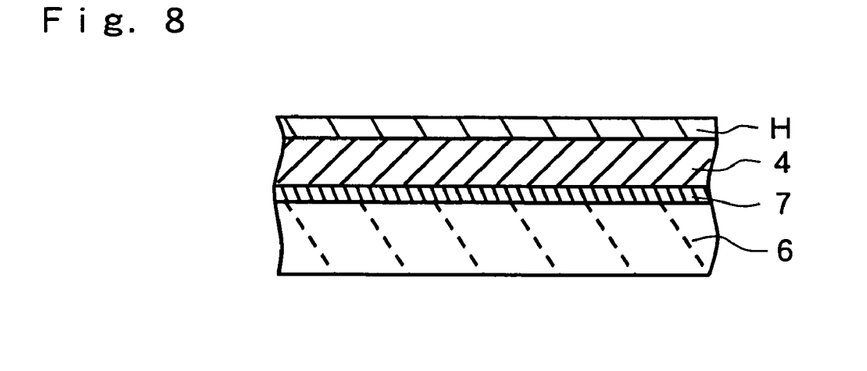
FIG. 8 is across-sectional view illustrating one example of an article provided with a functional layer of a functional film for transfer.

The silicone release PET film S314(R) of the obtained ITO film for transfer was peeled off to expose the adhesive layer (7), and the ITO film was stuck onto a polycarbonate base (6) by means of a laminator so that the adhesive layer (7) was brought into contact with the polycarbonate base (6) with a thickness of 2 mm. Ultraviolet rays were irradiated to cure the adhesive layer (7). Then, the support PET film (1) was peeled off. The ITO compressed layer (4) was formed on the polycarbonate base (6), and the cured silicone hardcoating layer (H) was presented on the ITO compressed layer (4). Thus, as shown in FIG. 8, the ITO compressed layer (4) was provided to the polycarbonate base (6) through the adhesive layer (7).

In Examples 1 to 8, examples, in which the inorganic functional film was produced respectively using the ITO fine particles as inorganic fine particles, were described. In Example 9, example, in which the ITO fine particles and the TiO$_2$ fine particles were used as inorganic fine particles to produce the ITO/TiO$_2$ multi-layer functional film, was shown. In the same manner as in Examples described above, various inorganic functional layers can be produced using inorganic fine particles having various properties such as WO$_3$ fine particles and Al$_2$O$_3$ fine particles.

As shown in Example 10, the functional film for transfer is formed using the functional film obtained by the method of the present invention, and the compressed layer of the functional fine particles in the functional film for transfer can be transferred to various bases. This has an advantageous in providing functional layer with a uniform thickness to an article having poor flexibility such as a plate material.

The foregoing Examples are in all aspects illustrative only and must not be construed as being restrictive. Further, all changes that fall within the range of equivalence of the claims are intended to be embraced within the scope of the present invention.

What is claimed is:

1. A method for producing a functional film which comprises at least one functional layer comprising a compressed layer of functional particles having a diameter of 10 μm or less on a support, said method comprising:

applying a liquid in which the functional particles are dispersed onto a transfer support and drying the liquid to form a transfer precursor film having a layer containing the functional particles formed on the transfer support at a temperature of 10 to 150 ° C.;

superposing the support on which the functional layer is to be formed and said transfer precursor film so that the support and said layer containing the functional particles are brought into contact with each other, and compressing said layer containing the functional particles to form the compressed layer of the functional particles on the support with a roll press machine at a compression force of at least 44 N/mm$^2$; and thereafter releasing the transfer support from said compressed layer of the functional particles, wherein the compressing and a transfer of the layer containing the functional particles from the transfer support to the support occur at the same time.

2. The method for producing a functional film according to claim 1, wherein a surface of the support on which the functional layer is to be formed is softer than a pencil hardness of 2H.

3. The method for producing a functional film according to claim 1, wherein said layer containing the functional particles is compressed at such a temperature that said support and said transfer support are not deformed.

4. The method for producing a functional film according to claim 1, wherein said transfer support has a coating layer having a pencil hardness of 2H or harder on a surface thereof on which the layer containing the functional fine particles is to be formed.

5. The method for producing a functional film according to claim 1, wherein said support is a film made of resin.

6. The method for producing a functional film according to claim 1, wherein said functional particles are selected from inorganic particles.

7. The method for producing a functional film according to claim 1, wherein the functional layer is selected from the group consisting of a conductive layer, an ultraviolet shielding layer, an infrared shielding layer, a magnetic layer, a ferromagnetic layer, a dielectric layer, a ferroelectric layer, an electrochromic layer, an electroluminescent layer, an insulating layer, a light-absorbing layer, a light selecting absorbing layer, a reflecting layer, a reflection preventing layer, a catalyst layer and a photocatalyst layer.

8. The method for producing a functional film according to claim 1, wherein conductive particles are used as said functional particles to form a conductive layer.

9. The method for producing a functional film according to claim 8, wherein inorganic conductive fine particles used as said conductive fine particles are selected from the group consisting of tin oxide, indium oxide, zinc oxide, cadmium oxide, antimony-doped tin oxide, fluorine-doped tin oxide, tin-doped indium oxide and aluminum-doped zinc oxide.

10. The method for producing a functional film according to claim 1, wherein said layer containing the functional particles is compressed with a compression force of at least 138 N/mm$^2$.

11. The method for producing a functional film according to claim 1, wherein said layer containing the functional particles is compressed with a compression force of at least 183 N/mm$^2$.

12. The method for producing a functional film according to claim 1, wherein said layer containing the functional particles is compressed with a compression force of up to 1000 N/mm$^2$.

* * * * *